United States Patent [19]

Mathieu et al.

[11] Patent Number: 5,048,559
[45] Date of Patent: Sep. 17, 1991

[54] VALVE AND APPARATUS USING SAID VALVE

[75] Inventors: Luc Mathieu; Jean-Marc Paquet, both of Annecy, France

[73] Assignee: Alcatel Cit, Paris, France

[21] Appl. No.: 574,725

[22] Filed: Aug. 30, 1990

[30] Foreign Application Priority Data

Sep. 1, 1989 [FR] France .................. 89 11486

[51] Int. Cl.⁵ .......................................... F16K 31/126
[52] U.S. Cl. .................................... 137/488; 251/5
[58] Field of Search .................. 137/486, 488; 251/5

[56] References Cited

U.S. PATENT DOCUMENTS

| | | | |
|---|---|---|---|
| 3,838,704 | 10/1974 | Johnson | 251/5 X |
| 4,138,087 | 2/1979 | Kruse | 251/5 |
| 4,573,491 | 3/1986 | Arens | 137/486 X |
| 4,645,174 | 2/1987 | Hicks | 251/5 |

FOREIGN PATENT DOCUMENTS 1595857 7/1970 France .
2458013 12/1980 France .

Primary Examiner—Alan Cohan
Attorney, Agent, or Firm—Sughrue, Mion, Zinn, Macpeak & Seas

[57] ABSTRACT

A valve comprising a rigid tube in which a flexible tube is situated with the two ends of the flexible tube being connected in sealed manner to the ends of the rigid tube, a control orifice being provided through the wall of the rigid tube in the vicinity of its middle region, and a core also being disposed inside the flexible tube, the core being smaller in cross-section than the inside section of the tube when in the rest state, wherein the core has a calibrated internal passage. The valve is suitable for preventing hammer in an installation having two zones at different pressures P1 and P2.

1 Claim, 1 Drawing Sheet

VALVE AND APPARATUS USING SAID VALVE

BACKGROUND OF THE INVENTION

The present invention relates to a valve providing incomplete closure and to apparatus constituting an application of said valve.

SUMMARY OF THE INVENTION

The valve of the invention comprises a valve having a rigid tube in which a flexible tube is situated with the two ends of the flexible tube being connected in sealed manner to the ends of the rigid tube, a control orifice being provided through the wall of the rigid tube in the vicinity of its middle region, and a core also being disposed inside the flexible tube, the core being smaller in cross-section than the inside section of the tube when in the rest state, wherein said core has a calibrated internal passage.

The invention also provides an anti-hammer apparatus for an installation comprising two zones at different pressures P1 and P2 such that P1>P2, the two zones being interconnected by a duct provided with an on/off cock, wherein a valve is placed in said duct in series with said on/off cock, said valve being controlled via its control orifice by means of a pneumatic slide valve, said slide valve having two communication paths enabling a common outlet C to be connected either to a first inlet a or else to a second inlet b, the slide valve including two drive inlets D and E for controlling displacement of the slide which establishes said communication paths, said slide valve being of the preferential control type with communication between a and C being provided when the drive inlets D and E are subjected to equal pressures, outlet C being connected to said control orifice of said valve, the inlet a being connected to a pressure P3≦P2, and the inlet b being connected to a pressure Pa>P1, control inlet D being connected to the zone at pressure P1 and control input E being connected to the zone at pressure P2.

BRIEF DESCRIPTION OF THE DRAWING

An embodiment of the invention is described by way of example with reference to the accompanying drawing, in which.

DETAILED DESCRIPTION

Figure 1:
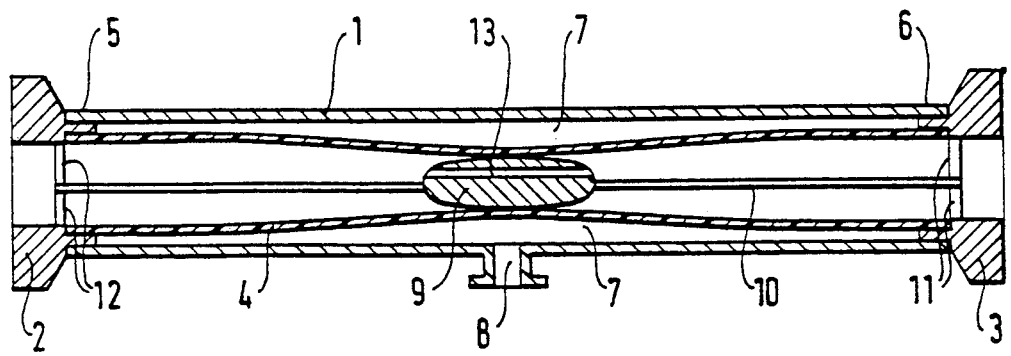
FIG. 1 is a diagram showing a valve of the invention.

With reference to FIG. 1, the valve comprises a rigid tube 1 provided with two connection endpieces 2 and 3. A flexible tube 4 is situated inside the rigid tube and its two ends 5 and 6 are fixed in sealed manner to the ends of the rigid tube 1. The central portion of the flexible tube 4 is free such that an empty space 7 exists between the rigid tube and the flexible tube. A control orifice 8 is formed through the wall of the rigid tube near the middle thereof. A core is disposed inside the flexible tube 4. This core is held by a shaft 10 which is fixed to the ends 2 and 3, for example by means of spokes such as 11 and 12. The core 9 has a calibrated internal passage 13. When the empty space 7 is pressurized via the orifice 8 to a pressure higher than that existing inside the flexible tube 4, then the valve is closed by the flexible tube constricting against the core 9. When the pressure inside the empty space 7 is equal to or less than the pressure in the flexible tube, the resilience of the flexible tube keeps it open. The calibrated passage 13 ensures that a minimum through section is maintained.

An application of the above-described valve is now described with reference to FIG. 2. This application relates to an anti-hammer device in an installation comprising a first zone 25 at a pressure P1 and a second zone 26 at a pressure P2 where P1>P2, said zones being interconnected by a duct 7 provided with an on/off cock 28. Under such circumstances, it is known that suddenly opening the cock 28 runs the risk of causing hammer strokes that may damage the installation.

By using a valve 16 that does not close completely, and as described above, it is possible to establish a connection progressively between the two zones 25 and 26 once the on/off cock 28 has been opened, and without taking special precautions.

The valve 16 is connected in series with the on/off cock 28 and the valve is controlled by means of its control orifice 8 which is connected by a duct 29 to the outlet C of a pneumatic slide valve 30.

The slide valve has a common outlet C and two inlets a and b and it enables C to be connected to a or else to b. The slide valve 20 also includes two control inlets D and E for controlling the displacement of the slide, thereby establishing the above-specified intercommunication paths.

The slide valve 30 is of the preferential control type establishing communication between a and C when the control inputs D and E are subjected to equal pressures. This preferred direction is represented by a spring 31. In a practical implementation, it may be provided by the slide itself having a larger cross-section on which the pressure from E is applied than its cross-section on which the pressure from D is applied. Such a valve is well known per se.

The outlet C is thus connected to the control orifice 8 of the valve 16, control inlet D is connected to tank 25 and control inlet E to tank 26.

Inlet a is connected to a pressure P3≦P2. In the example shown in the figure, inlet a is directly connected to tank 26 and is therefore at pressure P2. Finally, inlet b is subjected to a pressure Pa>P1. When the tank 25 is an evacuated vessel, inlet b is open to atmospheric pressure or to a pressurized gas (e.g. an inert gas) via a filter 32.

This is the configuration assumed in the description of operation provided below.

Figure 2:
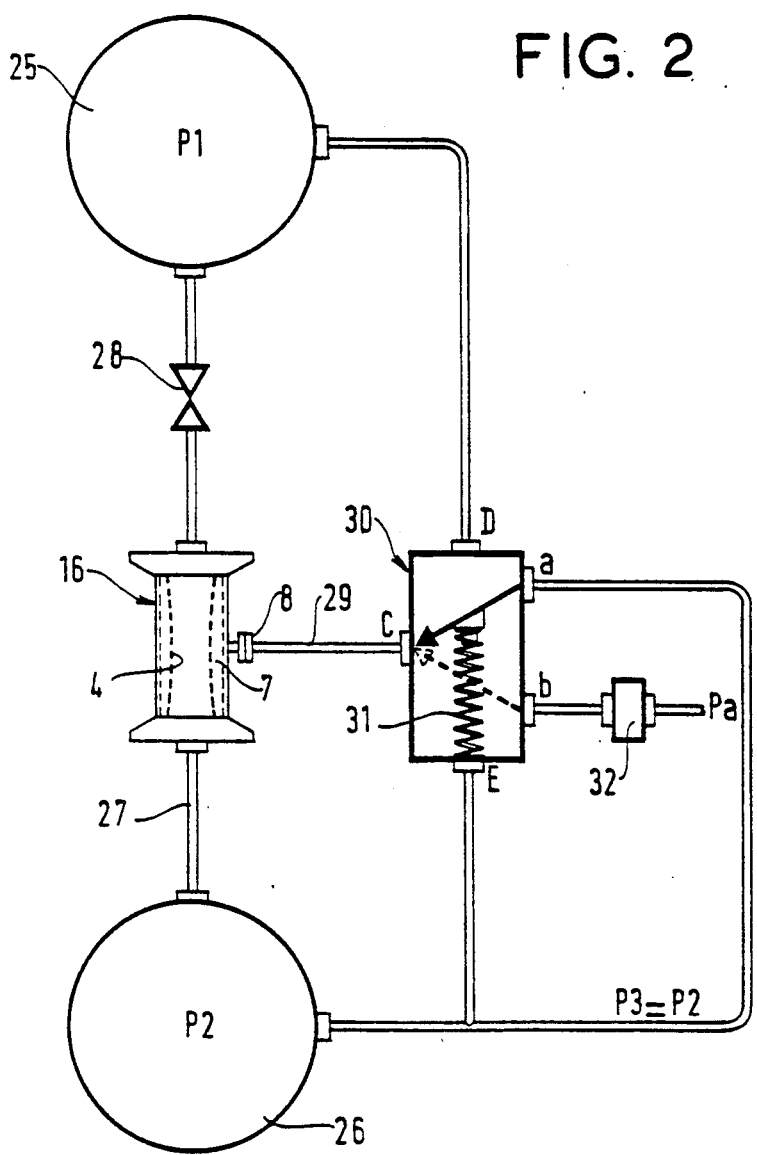
FIG. 2 shows an installation for putting two tanks at different pressures into communication with each other, the installation being provided with an anti-hammer device of the invention using the valve of FIG. 1.

With the tanks 25 and 26 out of communication with each other, and with on/off cock 28 closed, control inlet D is at pressure P1 which is greater than pressure P2 to which control inlet E is subjected, so the communication path established through the slide valve is thus b-C as shown in FIG. 2 by dashed lines. The empty space 7 in the valve 8 is thus subjected to atmospheric pressure Pa which is greater than the pressure P2 to which the inside of the flexible tube 4 of the valve 16 is subjected. This pressure Pa therefore causes the flexible tube to close. However this closure is not complete because the valve 16 cannot close fully since it includes a core with a calibrated passage, or alternatively if it does not include a core its flexible tube is sufficiently stiff to ensure that it does not close completely.

When the on/off cock 28 is opened, pressure equilibrium is achieved slowly via the valve 16 which is initially constricted. When the pressures P1 and P2 reach equilibrium, or a little earlier than that, the preferential control slide valve switches from having communication between b and C to having communication between a and C, as shown by the solid line in the figure. The space 7 is then at pressure P2 which is the same as the pressure inside the flexible tube 4. The resilience of the flexible tube 4 therefore enables it to take up an open position.

Communication is thus established between the two tanks automatically and without hammer.

We claim:

1. Anti-hammer apparatus for an installation comprising two zones at different pressures P1 and P2 such that P1>P2, a duct provided with an on/off cock interconnecting said two zones, a valve placed in said duct in series with said on/off cock, said valve comprising: a rigid tube, a flexible tube situated within said rigid tube with opposite ends of the flexible tube being connected in a sealed manner to the two ends of said rigid tube, a control orifice provided through the wall of the rigid tube in the vicinity of a middle region thereof, a core disposed inside the flexible tube, the core being smaller in cross-section than the inside section of the flexible tube when in the rest state, and said core having a calibrated internal passage, said valve being controlled via its control orifice by means of a pneumatic slide valve, said slide valve having two communication paths enabling a common outlet C to be connected either to a first inlet a or else to a second inlet b, the slide valve including two drive inlets D and E for controlling displacement of the slide which establishes said communication paths, said slide valve being of the preferential control type with communication between inlet a and common outlet C being provided when the drive inlets D and E are subjected to equal pressures, outlet C being connected to said control orifice of said valve, the inlet a being connected to a pressure P3≦P2, and the inlet b being connected to a pressure Pa>P1, control inlet D being connected to the zone at pressure P1 and control input E being connected to the zone at pressure P2.

* * * * *